United States Patent
Ando

(10) Patent No.: US 9,654,047 B2
(45) Date of Patent: May 16, 2017

(54) DRIVE DEVICE

(71) Applicant: FUJI ELECTRIC CO., LTD., Kawasaki-shi (JP)

(72) Inventor: Hirofumi Ando, Hino (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 8 days.

(21) Appl. No.: 14/878,961

(22) Filed: Oct. 8, 2015

(65) Prior Publication Data
US 2016/0036369 A1 Feb. 4, 2016

Related U.S. Application Data

(63) Continuation of application No. PCT/JP2014/067952, filed on Jul. 4, 2014.

(30) Foreign Application Priority Data

Sep. 27, 2013 (JP) ................. 2013-200871

(51) Int. Cl.
*H02P 7/00* (2016.01)
*H02P 29/00* (2016.01)
(Continued)

(52) U.S. Cl.
CPC .............. *H02P 29/00* (2013.01); *B60L 1/003* (2013.01); *B60L 3/0061* (2013.01); *B60L 3/12* (2013.01);
(Continued)

(58) Field of Classification Search
CPC ........ H02P 29/00; B60L 1/003; B60L 3/0061; B60L 3/12; B60L 15/20; B60L 2240/12;
(Continued)

(56) References Cited

U.S. PATENT DOCUMENTS 4,366,420 A * 12/1982 Omae .................. H02P 7/298
318/139
4,753,309 A * 6/1988 Marumoto ........... B62D 5/0463
180/446
(Continued)

FOREIGN PATENT DOCUMENTS

DE     19831582 A1    1/1999
JP      H07-219608 A    8/1995
(Continued)

OTHER PUBLICATIONS

Nagarjuna Rao Kandimala et al., "Safety and Security Features in AUTOSAR", pp. 1-15, Nov. 15, 2012.
(Continued)

*Primary Examiner* — Rita Leykin
(74) *Attorney, Agent, or Firm* — Rabin & Berdo, P.C.

(57) ABSTRACT

A drive device for controlling an electric motor, including a processor, and a non-transitory storage medium containing program instructions, execution of which by the process causes the drive device to provide functions of a customization unit and a core unit. The customization unit receives, from an external device, a command value designating an operating state of the electric motor, converts the command value using a predetermined reference value, and outputs the converted command value. The core unit receives the converted command value from the customization unit, recovers a physical quantity from the received converted command value, and controls the electric motor in accordance with the recovered physical quantity.

20 Claims, 6 Drawing Sheets

(51) Int. Cl.
*B60L 1/00* (2006.01)
*B60L 3/00* (2006.01)
*B60L 3/12* (2006.01)
*B60L 11/18* (2006.01)
*B60L 15/20* (2006.01)

(52) U.S. Cl.
CPC ........... *B60L 11/1803* (2013.01); *B60L 15/20* (2013.01); *B60L 2240/12* (2013.01); *B60L 2240/34* (2013.01); *B60L 2240/421* (2013.01); *B60L 2240/423* (2013.01); *B60L 2240/425* (2013.01); *B60L 2250/16* (2013.01); *Y02T 10/645* (2013.01); *Y02T 10/7005* (2013.01); *Y02T 10/7275* (2013.01); *Y02T 90/16* (2013.01)

(58) Field of Classification Search
CPC ........... B60L 2240/34; B60L 2240/421; B60L 2240/423; B60L 11/1803; B60L 2240/425; B60L 2250/16; Y02T 10/645; Y02T 10/7275; Y02T 90/16
USPC ........... 318/454; 700/23; 712/220, 221, 223; 701/36, 2, 1; 340/426.13, 426.14, 426.15, 340/5.65
See application file for complete search history.

(56) References Cited

U.S. PATENT DOCUMENTS

| | | |
|---|---|---|
| 5,949,663 A | 9/1999 | Endo et al. |
| 6,335,870 B1 | 1/2002 | Sakurai |
| 6,555,978 B1 * | 4/2003 | Castellon ............ H02H 7/0851 318/266 |
| 7,421,384 B2 * | 9/2008 | Yamada ................ G06F 11/261 702/117 |
| 7,904,212 B2 * | 3/2011 | Mensler ................ G01H 17/00 381/86 |
| 8,203,293 B2 * | 6/2012 | Ohgushi ............. H02P 21/0003 318/400.02 |
| 9,509,496 B2 * | 11/2016 | Kawamura ............. B60R 25/24 |
| 2007/0242398 A1 | 10/2007 | Ogawa |
| 2008/0138169 A1 * | 6/2008 | Jackson ................ F16B 5/0642 411/450 |
| 2009/0212928 A1 * | 8/2009 | Aijaz ...................... H04L 63/08 340/426.1 |
| 2009/0237016 A1 | 9/2009 | Iwashita et al. |
| 2011/0215901 A1 * | 9/2011 | Van Wiemeersch .... B60R 25/04 340/5.54 |
| 2012/0157079 A1 * | 6/2012 | Metivier ............. G07C 9/00182 455/420 |

FOREIGN PATENT DOCUMENTS

| | | |
|---|---|---|
| JP | H11-41943 A | 2/1999 |
| JP | 2002-017098 A | 1/2002 |
| JP | 2006-197677 A | 7/2006 |
| JP | 2007-239673 A | 9/2007 |
| JP | 2008-176609 A | 7/2008 |
| JP | 2013-192407 A | 9/2013 |

OTHER PUBLICATIONS

Nico Naumann "AUTOSAR Runtime Environment and Virtual Function Bus", pp. 1-19, Jan. 1, 2009.

Autosar, "AUTOSAR Application Interfaces 1-5 User Guide R4.0 Rev 3", Dec. 9, 2011.

Autosar, "AUTOSAR Unique Names for Documentation. Measurement and Calibration: Modeling and Naming Aspects including Automatic Generation", Nov. 3, 2011.

* cited by examiner

| ITEMS / MALFUNCTIONS | MALFUNCTION CODE | ENABLING/DISABLING | PROCESS PATTERN | PRIORITY ORDER | NUMBER OF DETECTIONS | EVENT LOG |
|---|---|---|---|---|---|---|
| IGBT MALFUNCTION | | | | | | |
| FUSE CUT | | | | | | |
| ABNORMALITY IN INITIAL CHARGING CIRCUIT | | | | | | |

Fig. 5

DRIVE DEVICE

CROSS-REFERENCE TO RELATED APPLICATIONS

This application is a continuation application under 35 U.S.C. 120 of International Application PCT/JP2014/067952 having the International Filing Date of Jul. 4, 2014, and claims the priority of Japanese Patent Application No. JP PA 2013-200871, filed on Sep. 27, 2013. The identified applications are fully incorporated herein by reference.

BACKGROUND OF THE INVENTION

Technical Field

The present invention relates to a drive device for controlling the drive of an electric motor.

Background Art

Electric vehicles have been increasingly widespread in recent years. An electric vehicle is equipped with an electric motor such as a three-phase AC (alternating current) motor as a source of power, a drive device such as an inverter for controlling the drive of the electric motor, and a host controller such as a VCU (Vehicle Control Unit) for communicating with the drive device to control the drive device. In response to an operation by the driver, the host controller generates various command values such as a torque command to be sent to the drive device (e.g., values representing the physical quantities of the output torque such as x[Nm]). In response to the command values from the host controller, the drive device adjusts the AC power to be supplied to the electric motor. In this manner, the running control of the electric vehicle is realized. The host controller also acquires various data stored in a memory of the drive device (e.g., data representing the current values of the output torque, revolving speed (the number of revolutions per unit time) and the like), to execute control for displaying various meters based on the data. This allows the driver to understand the condition of the vehicle.

BRIEF SUMMARY OF THE INVENTION

The process for adjusting the power to be supplied to the electric motor in response to the command values from the host controller is realized by activating the CPU (Central Processing Unit; "control unit," hereinafter) of the drive device in accordance with the control programs installed in the drive device. The functions that are realized by activating the control unit of the drive device in accordance with the control programs are roughly classified into an electric motor control function and a function attached thereto ("attached function," hereinafter). The electric motor control function is a function for executing electric motor activation control in response to the various command values from the host controller. The attached function, on the other hand, is a function for communicating with the host controller and controlling the peripheral devices. In the following description, the host controller, various peripheral devices, various sensors mounted in the electric motor and drive device, and various operators connected to the drive device are called "external devices."

The specs on the onboard network for mediating the communication between each external device and the drive device in an electric vehicle vary generally depending on the type or manufacturer of the electric vehicle. For this reason, it is preferred that the attached function be freely customized in accordance with the onboard network of the electric vehicle equipped with the drive device, and therefore the contents of the control programs need to be released to the manufacturer of the electric vehicle. For example, the source codes of the control programs need to be released to the manufacturer of the electric vehicle. On the other hand, in some cases the electric motor control function is created with ingenious ideas specific to the drive device. Therefore, it is preferred that the manufacturer of the drive device be able to conceal the details of the electric motor control function. However, there is a possibility that releasing the contents of the control programs as described above releases the details of the electric motor control function as well.

The present invention was contrived in view of the foregoing problems, and an object thereof is to provide a technique for enabling free customization of the attached function while concealing the details of the electric motor control function.

In order to solve the foregoing problems, the present invention provides a drive device having a power converter and a control unit. The power converter converts DC (direct current) power, supplied by a DC power supply, into AC power to be provided to an electric motor. The control unit executes transmission/reception of data to/from an external device and activation control of the power converter in accordance with a control program. This control program includes the following first and second programs. The first program is a program for operating the control unit as a core unit playing a role of the electric motor control function. The core unit receives a command value that designates the operating state of the electric motor and represents a value that is obtained by normalizing the physical quantity corresponding to the operating state by a predetermined reference value (e.g., a percentage, with physical quantity=reference value being 100%). The core unit then recovers the physical quantity from the command value and the reference value, to execute the activation control of the electric motor in accordance with the physical quantity. The second program, on the other hand, is a program that causes the control unit to function as a customization unit that plays a role of the attached function for mediating data transmission/reception between the external device and the core unit. This customization unit receives from the external device a command value that designates the operating state of the electric motor in terms of physical quantity, converts the command value into a command value normalized in use of the reference value, and provides the resultant command value to the core unit. Specific examples of the external device include a host controller that executes the activation control of the drive device, various sensors such as a temperature sensor for measuring the temperatures of the electric motor and the drive device, and various operators connected to the drive device. Rated values or maximum permissible values of various physical quantities, motor constants, and the like can be used as the reference value, and these values may be set as operation parameters in accordance with the type of the electric motor that is a subject of drive control.

In the drive device according to the present invention, the control programs are mounted as the first program for realizing the electric motor control function and the second program for realizing the attached function. Therefore, the delivery destination of the drive device can freely customize the attached function, with the processing details of only the second program being disclosed and the details of the electric motor control function being concealed. Data exchange between the core unit and the customization unit is executed with the data normalized using the predetermined reference value. Therefore, the rated values, maximum permissible values and motor constants can be concealed by including a software module that realizes this normalization in the first program as a software module that can be read from the second program as an API (application programming interface), further enhancing the level of cocealability of the details of the electric motor control function. Note that the core unit may be caused to execute a process for providing the customization unit with the current value of the physical quantity representing the operating state of the electric motor, which is a process for providing the customization unit with a predetermined type of physical quantity that is normalized with the predetermined reference value in accordance with the type of the physical value, and the customization unit may be caused to execute a process for converting the normalized current value out of the current values received from the core unit, into a physical quantity by using the reference value corresponding to the normalized current value. Japanese Patent Application Publication No. 2008-176609 (hereinafter "JPAP'609") discloses the invention related to an inverter that is capable of customizing the application unit easily and with a high level of quality. However, JPAP'609 does not describe that data exchange between the core unit and the customization unit is executed using normalized data such as percentage. Therefore, the technique disclosed in the invention of the present application is different from that of JPAP'609.

Examples of a specific method for disclosing the processing details of the attached function while concealing the details of the electric motor control function include a method for providing the drive device with a storage unit for storing the control programs, storing the first program and the second program in different storage areas of the storage unit, and imposing an access restriction on the storage area in which the first program is written (e.g. an access restriction for prohibiting dumping of the first program). For the purpose of disclosing the processing details of the attached function and facilitating the customization of the same, the storage area where the second program is stored may contain a source code file of the second program.

When the external device includes a sensor for measuring the current value of the physical quantity representing the operating state of the electric motor or power converter, a table that contains data for converting output data of the sensor into a physical quantity may be stored in the storage area with no access restriction (the storage area within the storage unit), and the control unit that is activated in accordance with the control programs may be caused to execute a process for converting the output data of the sensor into a physical quantity in accordance with the content stored in the table. Data for correcting the output characteristics unique to the individual sensors are stored in the table. Because any particular access restriction is not imposed on the storage area where the second program is stored, the delivery destination of the drive device can freely customize the content stored in the table. According to this aspect, the delivery destination can correct the output characteristics of the sensors freely and easily.

In another preferred aspect, data that represents a malfunction to be detected out of the malfunctions occurring in the electric motor or power converter may be associated with data that represents a process to be executed by the control unit when the malfunction is detected, and a table that stores the association of these data may be stored in the storage area with no access restriction (the storage area within the storage unit). When the malfunction to be detected is detected, the control unit that is activated in accordance with the control programs may execute the process that is defined according to the content stored in the table. For example, when the drive device is mounted in an electric vehicle and used for controlling the drive of the electric motor, it usually depends on the delivery destination of the drive device (the manufacturer of the electric vehicle) or the type of the vehicle equipped with the drive device, when it comes to determining what kind of malfunction of the electric motor of power converter to detect or what kind of process to execute in order to ensure the safety upon the occurrence of the malfunction. Therefore, it is preferred that each delivery destination be able to customize freely. This aspect can meet such demands while concealing the content of the program for controlling the electric motor.

In another preferred aspect, the core unit or the customization unit may be provided with a function for executing activation control of an initial charging circuit in response to an instruction from the external device, the initial charging circuit for gradually performing initial charging of a capacitor that is provided in a DC power transmission path extending from the DC power supply to the core unit or the customization unit. Specific examples of the initial charging circuit include a circuit that is configured with a first switch that is interposed between one of the terminals of the DC power supply and one of the polar plates of the capacitor and a second switch and a resistor that are interposed between the same terminal and the same polar plate. Examples of the foregoing activation control of the initial charging circuit include turning the second switch on first, charging the capacitor through the resistor, and then turning the second switch off and the first switch on. When mounting the drive device in an electric vehicle provided with such an initial charging circuit and controlling the drive of the electric motor using the drive device, it usually depends on the manufacturer of the vehicle whether to cause the host controller or drive device to execute the activation control of the initial charging circuit. Therefore, it is preferred that the manufacturer be able to freely determine whether to use the function in accordance with the demands of the manufacturer. This aspect can meet such demands.

BRIEF DESCRIPTION OF THE DRAWINGS

FIG. 5 is a diagram showing an example of a security table of modification (2) of the present invention.

DETAILED DESCRIPTION FOR THE INVENTION

Embodiments of the present invention are described hereinafter with reference to the drawings.

A: Configuration

Figure 1:
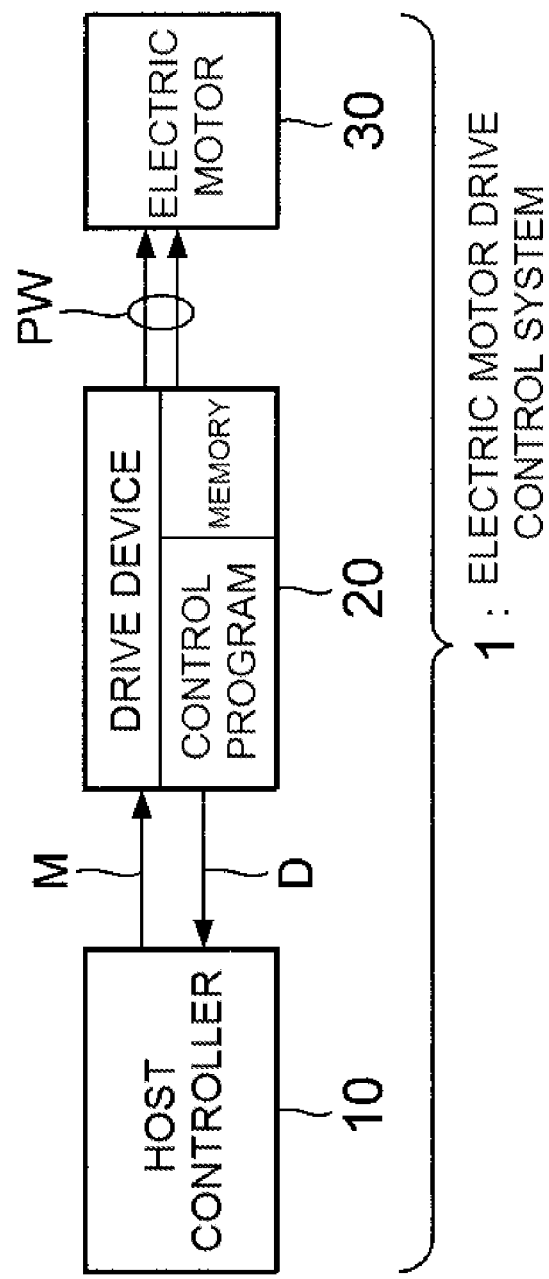
FIG. 1 is a diagram showing a configuration example of an electric motor drive control system 1 having a drive device 20 according to an embodiment of the present invention.

FIG. 1 is a diagram showing a configuration example of an electric motor drive control system 1 having a drive device 20 according to an embodiment of a drive device of the present invention. This electric motor drive control system 1 is a system built inside an electric vehicle. As shown in FIG. 1, the electric motor drive control system 1 includes an electric motor 30 as a source of power of the electric vehicle, the drive device 20 for controlling the drive of the electric motor 30, and a host controller 10 such as a VCU.

The host controller 10 is connected to the drive device 20 by a signal line such as a twisted pair cable. Furthermore, various operators for operating the vehicle, such as an accelerator plate (or sensors provided in the operators), and various meters such as a speedometer (not shown in FIG. 1) are connected to the host controller 10. The host controller 10 generates command values M that designate an output torque and a revolving speed of the electric motor 30 by physical quantities in response to operations performed on the various operators, sends the command values M to the drive device 20, receives data D representing the current values of the physical quantities corresponding to the output torque and the revolving speed of the electric motor 30 from the drive device 20, and executes display control on the meters in response to the data D.

The drive device 20 is, for example, an inverter that converts DC power supplied from a DC power supply (not shown in FIG. 1) such as an on-vehicle battery into AC power PW and sends the AC power PW to the electric motor 30. The drive device 20 includes a control unit for executing a control program that is installed beforehand, and a memory that is used as a work area when the control program is executed. In the present embodiment, executing the control program using the control unit realizes a process for controlling the AC power PW to be sent to the electric motor 30 in response to the various commands M from the host controller 10.

The functions in the drive device 20 that are realized by activating the control unit in accordance with the control program is classified into the electric motor control function and the attached function described above. The attached function described in the present embodiment is a function for communicating data with the host controller 10 through the signal line. The drive device 20 of the present embodiment is configured to be able to freely customize the attached function while concealing the details of the electric motor control function, which is one of the characteristics of the present embodiment. The drive device 20 that notably illustrates the characteristics of the present embodiment is mainly described hereinafter.

Figure 2:
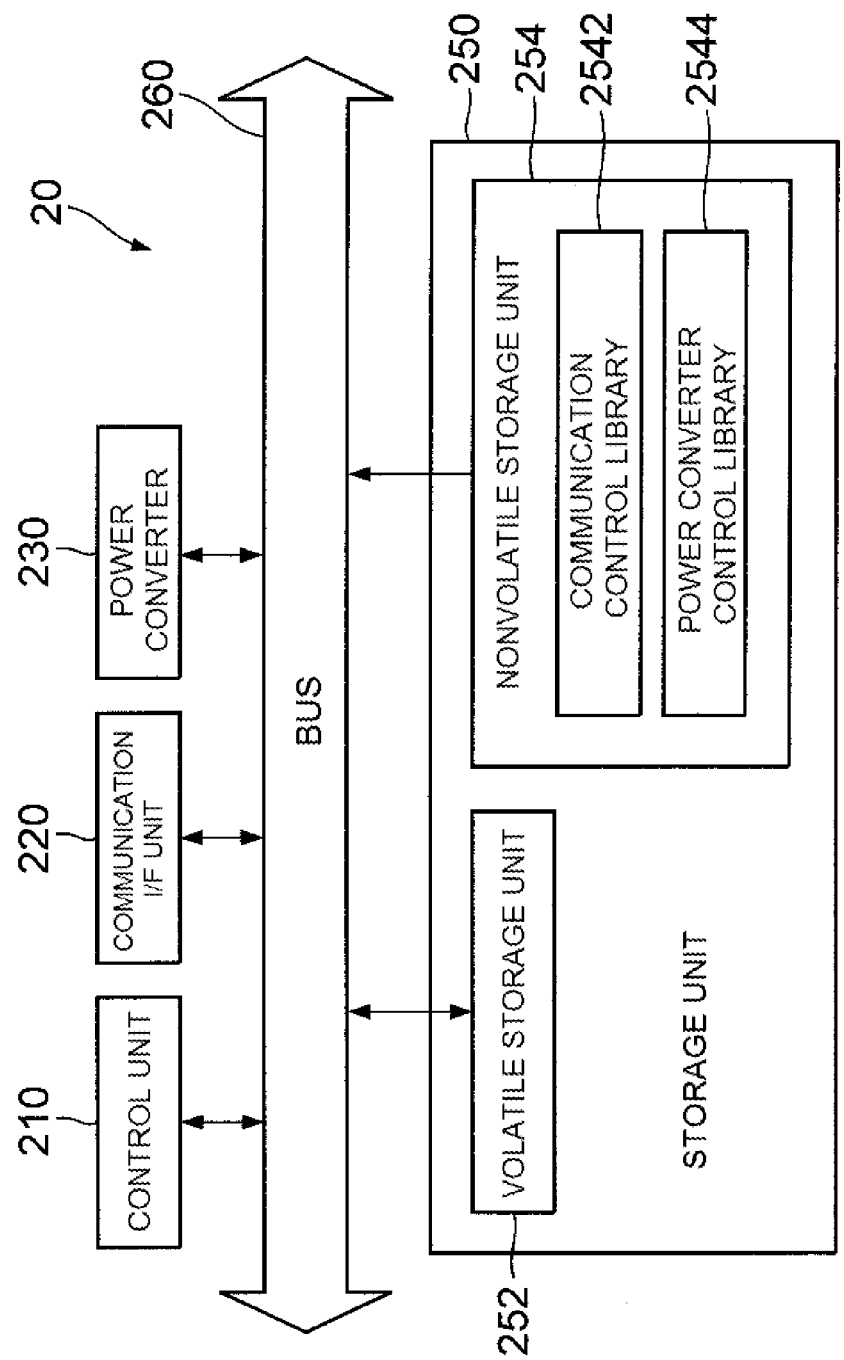
FIG. 2 is a diagram showing a configuration example of the drive device 20.

FIG. 2 is a diagram showing a configuration example of the drive device 20.

As shown in FIG. 2, the drive device 20 includes a control unit 210, a communication I/F (interface) unit 220, a power converter 230, a storage unit 250, and a bus 260 that mediates the exchange of data between these components. The control unit 210 is, for example, a CPU. The control unit 210 functions as the core of control in the drive device 20 by executing programs stored in the storage unit 250 (a nonvolatile storage unit 254, to be precise). The communication I/F unit 220 is, for example, a NIC (Network Interface Card). The communication I/F unit 220 is connected to the host controller 10 by a communication line. The communication I/F unit 220 receives the various commands M from the host controller 10 through the communication line, delivers the command M to the control unit 210, and transmits the various data D from the control unit 210 to the host controller 10 through the communication line.

The power converter 230 is connected to the foregoing DC power supply and the electric motor 30. The power converter 230 includes switching elements, such as an IGBT (insulated-gate bipolar transistor; not shown in FIG. 2). In the present embodiment, switching these switching elements (switching on/off) realizes conversion of the DC power supplied by the DC power supply into the AC power PW. ON/OFF control of the switching elements of the power converter 230 is executed by the control unit 210.

The storage unit 250 includes a volatile storage unit 252 and the nonvolatile storage unit 254. The volatile storage unit 252 is a RAM (Random Access Memory). The control unit 210 uses the volatile storage unit 252 as a work area for executing the various programs. The nonvolatile storage unit 254 includes a flash ROM (Read-Only Memory) and an EEPROM (Electrically Erasable Programmable Read-Only Memory). As shown in FIG. 2, the software libraries that each play a role of the foregoing control programs (the communication control library 2542 and the power converter control library 2544) are stored in the nonvolatile storage unit 254 beforehand.

More specifically, the communication control library 2542 and the power converter control library 2544 are stored in different storage areas of the flash ROM. Operation parameters that represent predetermined reference values for the output torque and revolving speed of the electric motor 30 are stored in the nonvolatile storage unit 254, and these operation parameters are stored in the EEPROM. Rated values or maximum permissible values can be used as the reference values for the output torque and revolving speed of the electric motor 30.

The communication control library 2542 is an aggregate of programs for causing the control unit 210 to realize the function communicating with the host controller 10 (i.e., the attached function described above). The power converter control library 2544 is an aggregate of programs for causing the control unit 210 to execute the function that performs activation control of the power converter 230 in response to the various commands M from the host controller 10 (i.e., the electric motor control function described above). Each of the programs included in the communication control library 2542 and each of the programs included in the power converter control library 2544 are created by the manufacturer of the drive device 20 and mounted in the drive device 20, but the mounting method has the following differences.

Each of the programs included in the power converter control library 2544 causes the control unit 210 to function as the core unit for realizing activation control of the power converter 230. As to the programs included in the power converter control library 2544, only those in executable file format are stored in a predetermined storage area of the flash ROM, and only the program identifiers for calling these programs and the specs on the arguments used for calling these programs are released to the manufacturer of the electric vehicle. Examples of the arguments include command values that designate the output torque and revolving speed of the electric motor 30. In the present embodiment, values that are normalized using the foregoing reference value are used as the command values (in the present embodiment, the percentage, with the reference values being 100%).

The power converter control library 2544 includes software modules for realizing interconversion between the command values corresponding to the physical quantities and the command values corresponding to the percentages, and these software modules are mounted in such a manner as to be readable as APIs (referred to as "interconversion APIs," hereinafter). The purpose of this is to conceal the motor constants and rated values from the manufacturer of the electric vehicle and to normalize checking the input values associated with the command values so as to be able to accommodate various types of electric motors by simply changing the reference values. For instance, this configuration can accommodate an electric motor driven at 100 W and an electric motor driven at 200 W without rewriting each of the programs included in the power converter control library 2544, by using a rated value as the reference value and establishing input value checking so as to allow inputting of a value that is 1.5 times higher than the rated value (i.e., 150%).

Access restrictions are imposed on one of the storage areas of the nonvolatile storage unit 254 where the power converter control library 2544 is stored (the storage area in the flash ROM where the power converter control library 2544 is stored) and the storage area where the operation parameters are stored (EEPROM), to prohibit dumping of the stored contents. More specifically, the control unit 210 is configured to forcibly stop the drive device 20 by turning its power off, when an access attempted to dump the stored content of the storage areas is detected. A known technology may appropriately be used as such a method for realizing an access restriction. In the present embodiment, the access restriction described above is imposed on the storage area of the nonvolatile storage unit 254 where the power converter control library 2544 is stored. For this reason, illegal reading of the power converter control library 2544 can be prevented, concealing the processing details of the electric motor control function. In addition, because access restriction is imposed similarly on the storage area in which the operation parameters are stored, the rated values and the like of the electric motor to be controlled can be concealed, making it difficult for the processing details of the electric motor control function to be analogized.

Figure 3:
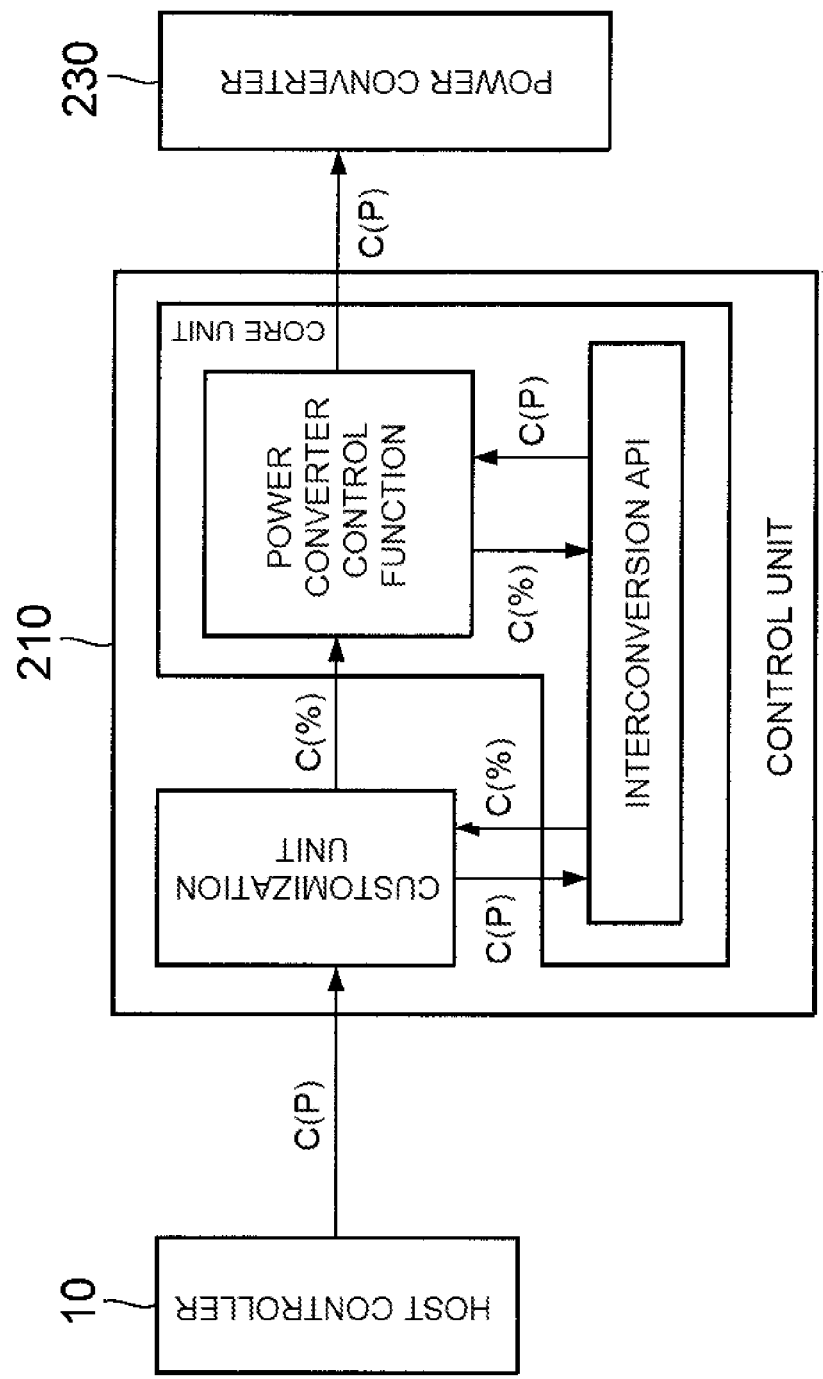
FIG. 3 is a diagram showing an example of a process that is executed by a control unit 210 of the drive device 20 in accordance with a communication control library 2542 and a power converter control library 2544.

The programs included in the communication control library 2542 are the programs for causing the control unit 210 to function as the customization unit that is customized appropriately for each of the onboard networks of electric vehicles equipped with this drive device 20. As shown in FIG. 3, the customization unit converts the command values of the physical quantities received from the host controller 10 into percentages by using the interconversion APIs, and sends the percentages to the core unit. The core unit, on the other hand, converts the command values of the percentages received from the customization unit into physical quantities by using the interconversion APIs, and performs the activation control of the power converter 230 to obtain the output torques or revolving speeds corresponding to the physical quantities, as shown in FIG. 3. In FIG. 3, the command values of the physical quantities are abbreviated as "C(P)" and the command values of the percentages as "C (%)."

No special access restriction is imposed on the storage area of the nonvolatile storage unit 254 where the communication control library 2542 is stored (the storage area in the flash ROM where the communication control library 2542 is stored). In this storage area, source codes are stored in addition to a so-called executable file (load module), so that the manufacturer of an electric vehicle equipped with the drive device 20 can customize the communication control library 2542 in accordance with the specs on the onboard network mounted in the electric vehicle. The manufacturer can reconstruct the communication control library 2542 to freely customize the attached function by rewriting and compiling the source codes appropriately.

According to the present embodiment, the control program of the drive device 20 is mounted in the communication control library 2542 and the power converter control library 2544, and only the source codes of the former are released to the manufacturer, allowing the manufacturer of the electric vehicle to freely customize the attached function while concealing the content of the power converter control library 2544 (i.e., the content of the power converter control function), as described above. In addition, according to the present embodiment, those various operation parameters such as the motor constants and rated values are concealed from the manufacturer of the electric vehicle, further enhancing the level of cocealability of the details of the electric motor control function.

B: Other Embodiments

The above has described an embodiment of the present invention. The following modifications may be added to this embodiment.

(1) The foregoing embodiment has described that a command value of a physical quantity directly designating the output torque or revolving speed of the electric motor 30 is sent from the host controller 10 to the drive device 20. However, a command value of a physical quantity that indirectly designates the output torque or revolving speed of the electric motor 30, such as the accelerator position and other degrees of the operations, may be sent from the host controller 10 to the drive device 20, and the process for converting the command value into percentage by using an API may be executed by the customization unit. In the foregoing embodiment, the process for converting the command value of the physical quantity received from the host controller 10 into percentage by using an interconversion API and then sending this conversion result to the core unit is executed by the customization unit, while the core unit executes the process for converting the command value of the percentage received from the customization unit into a physical quantity by using the interconversion API and then using the resultant physical quantity for the activation control of the power converter 230. In addition, the core unit may execute the process for converting the current value of the current flowing in the electric motor 30 or the current value of the revolving speed of the electric motor 30 into percentages and sending the current values to the customization unit. The customization unit may execute the process for converting a normalized current value into a physical quantity by using the interconversion API and sending the physical quantity to the host controller.

Figure 4:
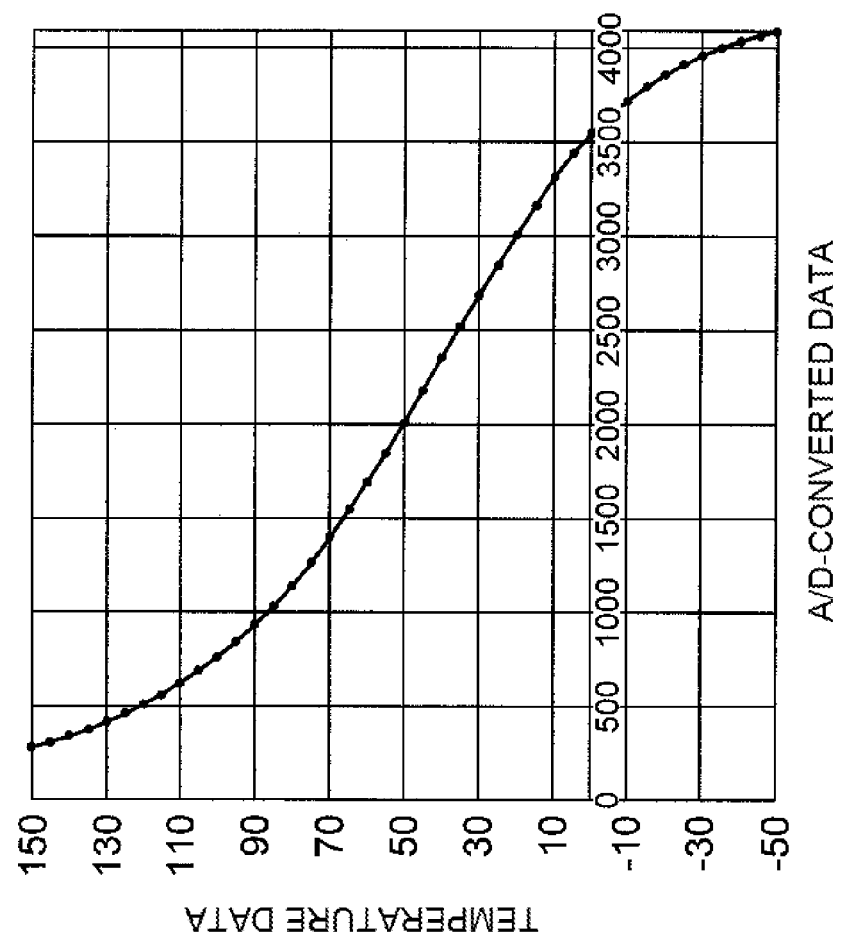
FIG. 4 is a diagram showing an example of an output characteristics correction table of modification (1) of the present invention.

Moreover, a temperature sensor for detecting the temperatures of the electric motor 30 and the power converter 230 (e.g., an NTC (negative temperature coefficient) thermister) may be connected to the drive device 20 as an external device, and the results of measurement by this temperature sensor may be sent to the host controller 10 to detect malfunctions or display the meters. When using such a sensor as an external device, it is generally the case that a conversion table in which the data representing the correlation between output data of the sensor and a physical quantity to be detected (see FIG. 4) are stored is used in order to correct the output characteristics of the sensor. Note that FIG. 4 shows a graph of the correlation between the A/D-converted (analog-to-digital converted) results and measured temperatures corresponding to the output data of the NTC thermister in a case where the temperatures are measured using the NTC thermister. The program for realizing interconversion between the output data of the sensor and the physical quantity by reference to this conversion table may be stored in the storage area with no access restriction or the storage area with an access restriction in the nonvolatile storage unit 254. However, it is preferred that the conversion table be stored in the storage area with no access restriction. By allowing the manufacturer of the electric vehicle to freely update the content stored in the conversion table, the content stored in the conversion table can freely be customized in accordance with the specs and characteristics of the various sensors mounted in the electric vehicle along with the drive device 20.

In a case where the program for executing the foregoing conversion process is implemented as a program of the core unit, the core unit may execute the process for using a predetermined reference value to normalize the predetermined types of physical quantities (output torque and revolving speed) out of the current values of the physical quantities representing the operating state of the electric motor 30 (output torque, revolving speed, temperature of the electric motor 30) in accordance with the types of the physical quantities, and sending the other type of current value (temperature, in the present embodiment) to the customization unit as a physical quantity. In this case, the customization unit may execute the process for converting the normalized current value received from the core unit into a physical quantity by using the reference value corresponding to this current value.

(2) In the drive device for an electric vehicle, usually an abnormality in the temperature of the electric motor 30 and a malfunction in the IGBT of the power converter 230 are detected, and security ensuring control is performed in accordance with the detected abnormality. Examples of this security ensuring control include preparing three types of operating states of the drive device 20, i.e., a normal state, a mild malfunction state, and a severe malfunction state, and then changing the operating state of the drive device 20 in accordance with the detected abnormality. Note that the normal state means a state in which the electric motor 30 is driven without any special restriction on the output torque or revolving speed. The mild malfunction state means a state in which the electric motor 30 is driven with the output torque and revolving speed being limited to the rated values or less, and the severe malfunction state means a state in which the drive of the electric motor 30 is stopped.

The type of abnormality detected in the drive device 20 and the details of control performed when an abnormality is detected in the drive device 20 generally vary depending on the type or specs of the electric vehicle equipped with the drive device 20, and it is preferred that the manufacturer of the electric vehicle be able to customize it freely. In such a case, the table shown in FIG. 5 (referred to as "protection table," hereinafter) and the program for updating the content stored in the protection table and realizing security ensuring control in accordance with the updated content may be stored in one of the storage areas, on which an access restriction is not imposed, of the nonvolatile storage unit 254.

As shown in FIG. 5, the protection table has stored therein data with respect to each malfunction to be detected (three types of problems, IGBT malfunction, fuse cut, and initial charging circuit abnormality, in the example shown in FIG. 5), such as a malfunction code, an enabling/disabling flag, a process pattern, a priority order, the number of detections, and an event log flag. See modification (3) for more details on the initial charging circuit. The malfunction code shown in FIG. 5 is an identifier representing the details of a malfunction. The enabling/disabling flag is a flag indicating whether a malfunction corresponding thereto is a subject of detection. When the value of the enabling/disabling flag is "1," it means that the malfunction is a subject of detection, but when the value of the enabling/disabling flag is "0," it means that the malfunction is not a subject of detection. The process pattern is an identifier that indicates the details of a process executed by the control unit 210 when a malfunction corresponding to the process pattern is detected. The priority order represents the seriousness of the malfunction with which the priority order is associated (whether the operating state is considered the mild malfunction state or severe malfunction state). The number of detections represents the number of times of detecting occurrence of associated malfunctions. When a detected malfunction corresponding the event log flag is detected, the event log flag indicates whether a detected malfunction corresponding thereto is recorded in the log or not.

Figure 6:
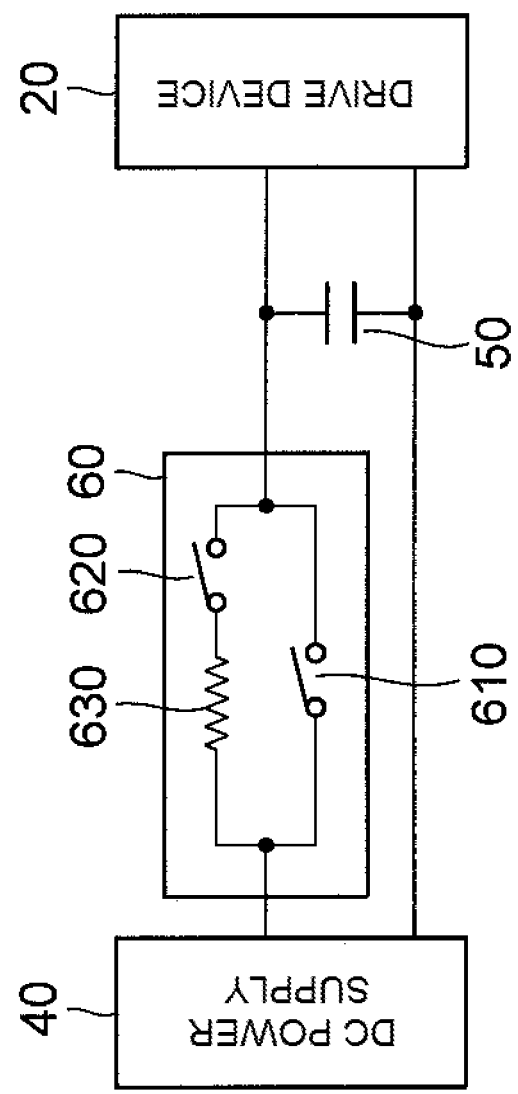
FIG. 6 is a diagram showing an example of an initial charging circuit of modification (3) of the present invention.

(3) An electric vehicle generally has a capacitor 50 at the DC power transmission path that extends from a DC power supply 40 to the drive device 20, and an initial charging circuit 60 that gradually performs initial charging of the capacitor 50, as shown in FIG. 6. The initial charging circuit 60 shown in FIG. 6 is a circuit configured with a first switch 610 interposed between one of the terminals of the DC power supply 40 (the positive electrode terminal in the example shown in FIG. 6) and one of the polar plates of the capacitor 50, and a second switch 620 and a resistor 630 that are interposed in series between the same terminal and the same polar plate. In activation control of the initial charging circuit 60, first, the second switch 620 is turned on, charging the capacitor 50 through the resistor 630. Subsequently, after a lapse of a predetermined time period from the beginning of the charging or when the voltage between the polar plates of the capacitor 50 reaches a predetermined value, the second switch 620 is turned off and the first switch 610 is turned on.

It is generally the case that the manufacturer of the electric vehicle to determine whether the activation control of the initial charging circuit is executed by the host controller or the drive device when the drive device of the electric vehicle provided with such a initial charging circuit controls the drive of the electric motor of the electric vehicle, and it is preferred that the manufacturer be able to freely customize whether to use such a function or not. In this case, either the core unit or the customization unit may function to execute the activation control of the initial charging circuit in response to the command sent from the external device (the host controller or the operator connected to the drive device). In addition, whether to use a control function of the initial charging circuit may be determined by setting the operation parameters.

(4) In the foregoing embodiment, the source code for each program contained in the communication control library 2542 is stored in the nonvolatile storage unit 254. However, because the program corresponding to the communication control library 2542 can be developed as long as the interfaces (the program identifiers and the arguments) of the programs included in the power converter control library 2544 are disclosed, it is not necessary to store the source codes in the nonvolatile storage unit 254. In the foregoing embodiment, an access restriction is imposed on a storage area, which is housed in the communication control library 2542, of the storage areas of the flash memory included in the nonvolatile storage unit 254 in order to prohibit dumping of data. However, each of the programs contained in the power converter control library 2544 may be encrypted and stored in the nonvolatile storage unit 254, and then these programs may be decoded and executed every time when executing the programs, thereby concealing the details of the processes of the electric motor control function. In a case where the control program is stored in the nonvolatile storage unit 254 as a program for realizing the electric motor control function and a program for realizing the attached function and only the latter is released, neither the above-mentioned access restriction nor encryption is necessary.

It is also not necessary to impose an access restriction on the storage area in which the operation parameters are stored. For example, if only the power converter control library 2544 needs to be concealed, it is not necessary to impose an access restriction on the storage area in which the operation parameters are stored. Also, at least some of the operation parameters may be copied to the storage area with no access restriction so that the manufacturer of the electric vehicle can freely update the storage area and freely determine whether the operation parameters stored in this storage area should be prioritized or the operation parameters stored in the storage area with an access restriction should be prioritized. This aspect enables fine adjustment of the level of cocealability of the operation parameters and the level of customization performed by the manufacturer of the electric vehicle.

(5) The foregoing embodiment has described the examples in which the present invention is applied to a drive device for driving an electric motor which is a source of power of an electric vehicle, but the present invention may be applied to a drive device for driving an electric motor that is a source of power for an air conditioner, an elevator, a machine tool, and the like.

The invention claimed is:

1. A drive device, comprising:
  a power converter configured to convert direct current (DC) power into AC (alternating current) power, and to provide the AC power to an electric motor;
  a control unit that is a processor, configured to transmit data to, or receive data from, an external device;
  a non-transitory storage medium containing program instructions, execution of which by the control unit causes the control unit to control the power converter by providing functions of:
    a core unit that
      receives a first command value, which designates an operating state of the electric motor and is obtained by normalizing a physical quantity corresponding to the operating state using a predetermined reference value,
      recovers the physical quantity using the received command value and the predetermined reference value, and
      controls the electric motor in accordance with the recovered physical quantity; and
    a customization unit that
      receives from the external device a second command value of the physical quantity, which designates the operating state of the electric motor,
      normalizes the second command value using the predetermined reference value, and
      provides the normalized second command value, as the first command value, to the core unit, wherein
    the core unit is configured to provide current values of physical quantities, corresponding to operating states of the electric motor, to the customization unit, including
      to normalize a predetermined type of physical quantity, among the physical quantities, using the predetermined reference value in accordance with the predetermined type, and
      to provide the normalized physical quantity to the customization unit, and
    the customization unit is configured to convert the normalized physical quantity into the physical quantity of the predetermined type, using the predetermined reference value, which corresponds to the normalized physical quantity.

2. The drive device according to claim 1, wherein
  ones of the program instructions for providing the function of the core unit and for providing the function of the customization unit are respectively stored in first and second storage areas of the storage medium that are different from each other, and
  access restriction is imposed on the first storage area, and is not imposed on the second storage area.

3. The drive device according to claim 2, wherein both a source code file and an executable file for providing the function of the customization unit are stored in the second storage area.

4. The drive device according to claim 3, wherein
  the external device includes at least one sensor for measuring the current values of the physical quantities representing the operating states of the electric motor or current values of physical quantities representing operating states of the power converter, and
  the storage medium includes a table stored in the second storage area, the table containing data in accordance with which the control unit converts output data of the at least one sensor into the physical quantities.

5. The drive device according to claim 4, wherein the second storage area stores therein another table that contains
  data that represents a malfunction occurring in the electric motor or the power converter, and
  data that represents a process to be executed by the control unit upon detection of the occurrence of the malfunction.

6. The drive device according to claim 5, wherein one of the core unit and the customization unit is configured to control an initial charging circuit for gradually performing initial charging of a capacitor in response to an instruction received from the external device, the capacitor being provided in a DC power transmission path extending from a DC power supply that supplies the DC power to the core unit or the customization unit.

7. The drive device according to claim 4, wherein one of the core unit and the customization unit is configured to control an initial charging circuit for gradually performing initial charging of a capacitor in response to an instruction received from the external device, the capacitor being provided in a DC power transmission path extending from a DC power supply that supplies the DC power to the core unit or the customization unit.

8. The drive device according to claim 3, wherein the second storage area stores therein a table that contains
  data that represents a malfunction occurring in the electric motor or the power converter, and
  data that represents a process to be executed by the control unit upon detection of the occurrence of the malfunction.

9. The drive device according to claim 8, wherein one of the core unit and the customization unit is configured to control an initial charging circuit for gradually performing initial charging of a capacitor in response to an instruction received from the external device, the capacitor being provided in a DC power transmission path extending from a DC power supply that supplies the DC power to the core unit or the customization unit.

10. The drive device according to claim 3, wherein one of the core unit and the customization unit is configured to control an initial charging circuit for gradually performing initial charging of a capacitor in response to an instruction received from the external device, the capacitor being provided in a DC power transmission path extending from a DC power supply that supplies the DC power to the core unit or the customization unit.

11. The drive device according to claim 2, wherein
the external device includes at least one sensor for measuring the current values of the physical quantities representing the operating states of the electric motor or current values of physical quantities representing operating states of the power converter, and
the storage medium includes a table stored in the second storage area, the table containing data in accordance with which the control unit converts output data of the at least one sensor into the physical quantities.

12. The drive device according to claim 11, wherein the second storage area stores therein another table that contains
data that represents a malfunction occurring in the electric motor or the power converter, and
data that represents a process to be executed by the control unit upon detection of the occurrence of the malfunction.

13. The drive device according to claim 12, wherein one of the core unit and the customization unit is configured to control an initial charging circuit for gradually performing initial charging of a capacitor in response to an instruction received from the external device, the capacitor being provided in a DC power transmission path extending from a DC power supply that supplies the DC power to the core unit or the customization unit.

14. The drive device according to claim 11, wherein one of the core unit and the customization unit is configured to control an initial charging circuit for gradually performing initial charging of a capacitor in response to an instruction received from the external device, the capacitor being provided in a DC power transmission path extending from a DC power supply that supplies the DC power to the core unit or the customization unit.

15. The drive device according to claim 2, wherein the second storage area stores therein a table that contains
data that represents a malfunction occurring in the electric motor or the power converter, and
data that represents a process to be executed by the control unit upon detection of the occurrence of the malfunction.

16. The drive device according to claim 15, wherein one of the core unit and the customization unit is configured to control an initial charging circuit for gradually performing initial charging of a capacitor in response to an instruction received from the external device, the capacitor being provided in a DC power transmission path extending from a DC power supply that supplies the DC power to the core unit or the customization unit.

17. The drive device according to claim 2, wherein one of the core unit and the customization unit is configured to control an initial charging circuit for gradually performing initial charging of a capacitor in response to an instruction received from the external device, the capacitor being provided in a DC power transmission path extending from a DC power supply that supplies the DC power to the core unit or the customization unit.

18. The drive device according to claim 1, wherein one of the core unit and the customization unit is configured to control an initial charging circuit for gradually performing initial charging of a capacitor in response to an instruction received from the external device, the capacitor being provided in a DC power transmission path extending from a DC power supply that supplies the DC power to the core unit or the customization unit.

19. A drive device for controlling an electric motor, comprising:
a processor; and
a non-transitory storage medium containing program instructions, execution of which by the processor causes the drive device to provide functions of:
a customization unit that receives, from an external device, a command value designating an operating state of the electric motor, normalizes the command value using a predetermined reference value to thereby obtain a normalized command value, and outputs the normalized command value, and
a core unit that receives the normalized command value from the customization unit, recovers a physical quantity from the received normalized command value, and controls the electric motor in accordance with the recovered physical quantity.

20. A method for controlling an electric motor, comprising:
receiving, by a processor executing first program instructions stored in a first area of a storage medium, a command value designating an operating state of the electric motor from an external device;
converting, by the processor executing the first program instructions, the command value using a predetermined reference value;
outputting, by the processor executing the first program instructions, the converted command value;
receiving, by the processor executing second program instructions stored in a second area of the storage medium, the converted command value;
recovering, by the processor executing the second program instructions, a physical quantity from the received converted command value; and
controlling, by the processor executing the second program instructions, the electric motor in accordance with the recovered physical quantity,
wherein the second area, but not the first area, has access restriction imposed thereon.

* * * * *